(12) United States Patent
Corl

(10) Patent No.: US 8,677,413 B2
(45) Date of Patent: *Mar. 18, 2014

(54) INFORMATION DESCRIPTOR AND EXTENDED INFORMATION DESCRIPTOR DATA STRUCTURES FOR DIGITAL TELEVISION SIGNALS

(75) Inventor: Mark T. Corl, Princeton Junction, NJ (US)

(73) Assignee: LG Electronics Inc., Seoul (KR)

( * ) Notice: Subject to any disclaimer, the term of this patent is extended or adjusted under 35 U.S.C. 154(b) by 46 days.

This patent is subject to a terminal disclaimer.

(21) Appl. No.: 13/610,252

(22) Filed: Sep. 11, 2012

(65) Prior Publication Data

US 2013/0067520 A1 Mar. 14, 2013

Related U.S. Application Data

(63) Continuation of application No. 13/032,265, filed on Feb. 22, 2011, now Pat. No. 8,510,777, which is a continuation of application No. 11/980,820, filed on Oct. 31, 2007, now Pat. No. 7,917,926, which is a continuation of application No. 11/211,541, filed on Aug. 26, 2005, now Pat. No. 7,877,770, which is a continuation of application No. 09/835,559, filed on Apr. 17, 2001, now Pat. No. 7,877,769.

(60) Provisional application No. 60/197,676, filed on Apr. 17, 2000.

(51) Int. Cl.
*H04N 5/445* (2011.01)
(52) U.S. Cl.
USPC .............. 725/45; 725/39; 725/40; 725/41; 725/43; 725/46

(58) Field of Classification Search
USPC .................................. 725/39–46
See application file for complete search history.

(56) References Cited

U.S. PATENT DOCUMENTS

| | | |
|---|---|---|
| 5,523,796 A | 6/1996 | Marshall et al. |
| 5,585,685 A | 12/1996 | Maeno et al. |
| 5,585,865 A | 12/1996 | Amano et al. |
| 5,740,549 A | 4/1998 | Reilly et al. |
| 5,760,838 A | 6/1998 | Adams et al. |
| 5,793,438 A | 8/1998 | Bedard |
| 5,841,433 A | 11/1998 | Chaney |
| 5,850,218 A | 12/1998 | LaJoie et al. |
| 5,889,950 A | 3/1999 | Kuzma |
| 5,926,230 A | 7/1999 | Niijima et al. |
| 6,002,394 A | 12/1999 | Schein et al. |
| 6,005,631 A | 12/1999 | Anderson et al. |

(Continued)

FOREIGN PATENT DOCUMENTS

WO WO 99/20049 4/1999

OTHER PUBLICATIONS

U.S. Appl. No. 08/900,417, filed Jul. 25, 1997, Daniels.

(Continued)

*Primary Examiner* — An Son P Huynh
(74) *Attorney, Agent, or Firm* — McKenna Long & Aldridge LLP

(57) ABSTRACT

A digital television (DTV) data stream includes an event information table (EIT), the EIT including: a descriptor including: a descriptor tag identifying the descriptor as a genre descriptor, a descriptor length field, and at least one category code for an associated event in a DTV data stream.

2 Claims, 3 Drawing Sheets

(56) References Cited

U.S. PATENT DOCUMENTS

| | | |
|---|---|---|
| 6,008,803 A | 12/1999 | Rowe et al. |
| 6,029,193 A | 2/2000 | Yamamoto et al. |
| 6,147,714 A | 11/2000 | Terasawa et al. |
| 6,169,543 B1 | 1/2001 | Wehmeyer |
| 6,177,931 B1 | 1/2001 | Alexander et al. |
| 6,216,264 B1 | 4/2001 | Maze et al. |
| 6,216,265 B1 | 4/2001 | Roop et al. |
| 6,240,555 B1 | 5/2001 | Shoff et al. |
| 6,243,142 B1 | 6/2001 | Mugura et al. |
| 6,249,320 B1 | 6/2001 | Schneidewend et al. |
| 6,256,071 B1 | 7/2001 | Hiroi |
| 6,263,501 B1 | 7/2001 | Schein et al. |
| 6,275,268 B1 | 8/2001 | Ellis et al. |
| 6,301,577 B1 | 10/2001 | Matsumoto et al. |
| 6,313,886 B1 | 11/2001 | Sugiyama |
| 6,314,571 B1 | 11/2001 | Ogawa et al. |
| 6,317,885 B1 | 11/2001 | Fries |
| 6,348,932 B1 | 2/2002 | Nishikawa et al. |
| 6,353,444 B1 | 3/2002 | Katta et al. |
| 6,442,755 B1 | 8/2002 | Lemmons et al. |
| 6,462,784 B1 | 10/2002 | Kohno et al. |
| 6,463,586 B1 | 10/2002 | Jerding |
| 6,502,243 B1 | 12/2002 | Thomas |
| 6,519,009 B1 | 2/2003 | Hanaya et al. |
| 6,519,655 B1 | 2/2003 | Pitot et al. |
| 6,522,342 B1 | 2/2003 | Gagnon et al. |
| 6,526,577 B1 | 2/2003 | Knudson et al. |
| 6,529,526 B1 | 3/2003 | Schneidewend |
| 6,588,014 B1 | 7/2003 | Hayashi |
| 6,665,687 B1 | 12/2003 | Burke |
| 6,700,624 B2 | 3/2004 | Yun |
| 6,745,223 B1 | 6/2004 | Nobakht et al. |
| 6,745,245 B1 | 6/2004 | Carpenter |
| 6,745,391 B1 | 6/2004 | Macrae et al. |
| 6,757,707 B1 | 6/2004 | Houghton et al. |
| 6,782,553 B1 | 8/2004 | Ogawa et al. |
| 6,801,340 B1 | 10/2004 | Endo |
| 6,820,278 B1 | 11/2004 | Ellis |
| 6,868,551 B1 | 3/2005 | Lawler et al. |
| 6,938,208 B2 | 8/2005 | Reichardt |
| 6,944,876 B1 | 9/2005 | Whitelaw |
| 6,966,627 B2 | 11/2005 | Escobedo et al. |
| 6,971,119 B1 | 11/2005 | Arsenault et al. |
| 6,973,669 B2 | 12/2005 | Daniels |
| 6,978,471 B1 | 12/2005 | Klopfenstein |
| 6,993,782 B1 | 1/2006 | Newberry et al. |
| 7,020,839 B1 | 3/2006 | Hosoda |
| 7,024,676 B1 | 4/2006 | Klopfenstein |
| 7,028,331 B2 | 4/2006 | Schwalb |
| 7,032,236 B1 | 4/2006 | Ozkan et al. |
| 7,062,777 B2 | 6/2006 | Alba et al. |
| 7,065,777 B2 | 6/2006 | Inoue |
| 7,124,356 B1 | 10/2006 | Alsafadi et al. |
| 7,134,133 B1 | 11/2006 | Wugofski |
| 7,143,428 B1 | 11/2006 | Bruck et al. |
| 7,150,029 B1 | 12/2006 | Ebling et al. |
| 7,165,098 B1 | 1/2007 | Boyer et al. |
| 7,178,158 B2 | 2/2007 | Nishina et al. |
| 7,496,946 B1 | 2/2009 | Wehmeyer et al. |
| 2002/0007493 A1 | 1/2002 | Butler et al. |
| 2002/0056103 A1 | 5/2002 | Gong |
| 2002/0144281 A1 | 10/2002 | Taguchi et al. |
| 2003/0066085 A1 | 4/2003 | Boyer et al. |
| 2003/0097657 A1 | 5/2003 | Zhou et al. |
| 2003/0208760 A1 | 11/2003 | Sugai et al. |
| 2003/0217360 A1 | 11/2003 | Gordon et al. |
| 2003/0223734 A1 | 12/2003 | Cooper, Jr. et al. |
| 2004/0117831 A1 | 6/2004 | Ellis et al. |
| 2004/0172661 A1 | 9/2004 | Yagawa et al. |
| 2004/0210932 A1 | 10/2004 | Mori et al. |
| 2004/0255150 A1 | 12/2004 | Sezan et al. |
| 2005/0097603 A1 | 5/2005 | Kikinis |
| 2008/0250454 A1 | 10/2008 | Nishina et al. |
| 2009/0055868 A1 | 2/2009 | Wehmeyer et al. |
| 2009/0133075 A1 | 5/2009 | Nishina et al. |

OTHER PUBLICATIONS

Program and Systems Information Protocol for Terrestrial Broadcast and Cable, Dec. 1997, Advanced Television System Committee. Doc. A/65.

Michael isnardi, "ATSC Program and System Information Protocol (PSiP)", Apr. 8, 2000, Sarnoff Corporation.

Program Guide for Digital Television ATSC Standard, Jan. 3, 1996, Advanced Television Systems Committee, Doc. A/55.

Technical Corrigendum No. 1 to ATSC Standard: Program and System Information Protocol for Terrestrial Broadcast and Cable, Dec. 17, 1999, Advanced Television Systems Committee. Doc A/66.

James C. McKinney, Program guide for Digital Television ATSC Standard, Jan. 1996, pp. 1-47.

"Program and System Information Protocol for Terrestrial Broadcast and Cable (Revision A) and Amendments No. 1 and 3", Dec. 1997, Rev. A—May 31, 2000, ATSC.

FIG. 2
Background Art

| LISTINGS | △▽ Listing | ◁ ▷ 6:06P AUG 16 |
|---|---|---|

| 5:00 | 5:30 | 6:00 | 6:30 | 7:00 | 7:30 | 8:00 |
|---|---|---|---|---|---|---|

| | | |
|---|---|---|
| NBC | 4 | News |
| ABC | 6 | News |
| CBS | 10 | CBS News |
| Fox | 28 | Club Paradise (5:00) |
| PBS | 29 | Mystery ! |
| COM | 30 | Tribute to Carson |
| HBO | 33 | Gremlins 2: The New Batch |
| ESN | 34 | Tennis (4:30) |
| AMC | 35 | Arise my Love (5:00) |
| DSC | 37 | Natural World |
| NIK | 38 | I Love Lucy |

INFORMATION DESCRIPTOR AND EXTENDED INFORMATION DESCRIPTOR DATA STRUCTURES FOR DIGITAL TELEVISION SIGNALS

CONTINUITY DATA

This application is a continuation of application Ser. No. 13/032,265, filed on Feb. 22, 2011 now U.S. Pat. No. 8,510,777 which is a continuation of application Ser. No. 11/980,820, filed on Oct. 31, 2007 (now issued as U.S. Pat. No. 7,917,926) which is a continuation of application Ser. No. 11/211,541, filed on Aug. 26, 2005 (now issued as U.S. Pat. No. 7,877,770) which is a continuation of application Ser. No. 09/835,559, filed on Apr. 17, 2001 (now issued as U.S. Pat. No. 7,877,769), the entire contents of which are hereby incorporated by reference and for which priority is claims under 35 U.S.C. §120. This application claims priority upon U.S. Provisional Patent Application No. 60/197,676, filed Apr. 17, 2000, the entirety of which is hereby incorporated by reference.

FIELD OF THE INVENTION

The invention is directed to meta data for use in digital television signals, and more particularly for meta data in a digital television signal that is used to generate an electronic program guide.

BACKGROUND OF THE INVENTION

An electronic program guide (EPG) is a (typically) interactive graphical user interface (GUI) that a receiver of a digital television (DTV) signal can generate. An EPG is superimposed on the DTV event, e.g., program, that is currently being displayed. The EPG provides a viewer/user with information about the events currently being shown and that will be available for some amount of time into the future.

Some EPGs can only provide textual descriptions of the events themselves, of the ratings of potentially-objectionable content in the events (content advisory ratings) and of the encoding information. Encoding information can include indications of DOLBY stereo audio, which video format is used (e.g., there being 18 video formats according to the American Television Standards Committee standard for terrestrial digital television), closed captioning availability, etc. Examples of such EPGs are depicted in FIGS. 1-2.

A specific type of DTV signal is a terrestrial broadcast DTV signal that conforms to the standards of the Advanced Television Standards Committee (ATSC). Among the many ATSC standards for aspects of a terrestrial DTV signal, the specification for meta data used in an EPG is contained in ATSC A/65 and its addenda, A/66 and A/67. Such meta data is referred to as Program and System Information Protocol (PSIP) data. The PSIP specification promulgated by the ATSC only provides for textual descriptions of the events themselves, of the ratings of potentially-objectionable content in the events and of the encoding information. As such, the current PSIP specification only provides for an EPG that is about as visually-compelling as those of FIGS. 1-2, In other words, the current PSIP-specified EPG is not visually compelling, i.e., it is bland in appearance.

Given the great improvement in the quality of event images made possible by an ATSC-compliant terrestrial DTV signal, such a bland EPG is inconsistent. Broadcasters and content providers want to add more viewer-compelling advertising and event-content information to the EPG displays. It is a problem that there is no standard way of providing such advertising and event-content information.

SUMMARY OF THE INVENTION

The invention, among other things, provides a solution to the problem described above.

The invention, in part, provides a new type of meta data structure that provides data and/or or a link to such data that is used by an EPG generator in a DTV receiver to display visually-compelling information about an event. Such information can include: an icon associated with the broadcaster of the event and/or the source of the event; a graphic representing a rating of potentially-objectionable content in the event; a still image representative of or having a relation to the event; a video excerpt of or having a relation to the event; an advertisement related to the event, its broadcaster and/or its source; etc.

The invention, also in part, provides a meta data structure (a descriptor) that can be attached to entries in PSIP tables, e.g., an event in an event information table (EIT) or a virtual channel in a virtual channel table (VCT). The descriptor provides a way to reference other content in a different or the same DTV data stream or available via a network that can be used by the receiver to display other types of content. The descriptor also provides the type of the data and an expected usage of the data.

Parsing and displaying the visually-compelling information provided via such a descriptor is an optional feature of a DTV receiver system. For those that support this mechanism, the EPG that a DTV receiver generates can be enhanced dramatically.

The meta data structure (descriptor) according to the invention is especially advantageous because of the typing and usage values that it contains. A DTV receive can analyze such typing and usage values before accessing the data referenced in the descriptor. In some instances, such pre-access analysis can preclude the EPG generator from attempting to generate the visually-compelling information, thus reducing computational overhead and computing resource waste.

According to an aspect of the present invention, there is provided a digital television (DTV) data stream including program and system information protocol (PSIP) data associated with content of the DTV data stream, the PSIP data including a virtual channel table (VCT) and an event information table (EIT), the EIT comprising: a source identification field identifying a source of an associated event in a DTV data stream; an event identification field indicating an identification of the event; a start time field indicating a star time of the event; a title field indicating a title of the event; and a descriptor comprising: a descriptor tag identifying the descriptor as a genre descriptor; a descriptor length indicating a total length of the descriptor, and at least one category code for an associated event in a DTV data stream, each category code specifying genre, program type, or category information of the associated event, wherein the at least one category code specifies at least one of a set of basic categories.

According to another aspect of the present invention, there is provided a memory for containing program and system information protocol (PSIP) data associated with content of a digital television (DTV) data stream, the PSIP data including a virtual channel table (VCT) and an event information table (EIT), the EIT comprising: a source identification field identifying a source of an associated event in a DTV data stream; an event identification field indicating an identification of the event; a start time field indicating a star time of the event; a title field indicating a title of the event; and a descriptor comprising: a descriptor tag identifying the descriptor as a genre descriptor; a descriptor length indicating a total length of the descriptor; and at least one category code for an associated event in a DTV data stream, each category code specifying genre, program type, or category information of the associated event, wherein the at least one category code specifies at least one of a set of basic categories.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIGS. 1-2 are depictions of visually-bland EPG screens according to the background art.

DETAILED DESCRIPTION OF THE PREFERRED EMBODIMENTS

Examples of four meta data structures (descriptors) according to the invention will be described. Such descriptors extend the sort of information that can be supplied in a digital television (DTV) signal that complies with the program and system information protocol (PSIP) meta data specification promulgated for digital terrestrial television according to the Advanced Television Standards Committee (ATSC). Such extended information makes it possible for a ATSC-compliant receiver to generate an electronic program guide (EPG) the includes visually-compelling information.

Figure 1:
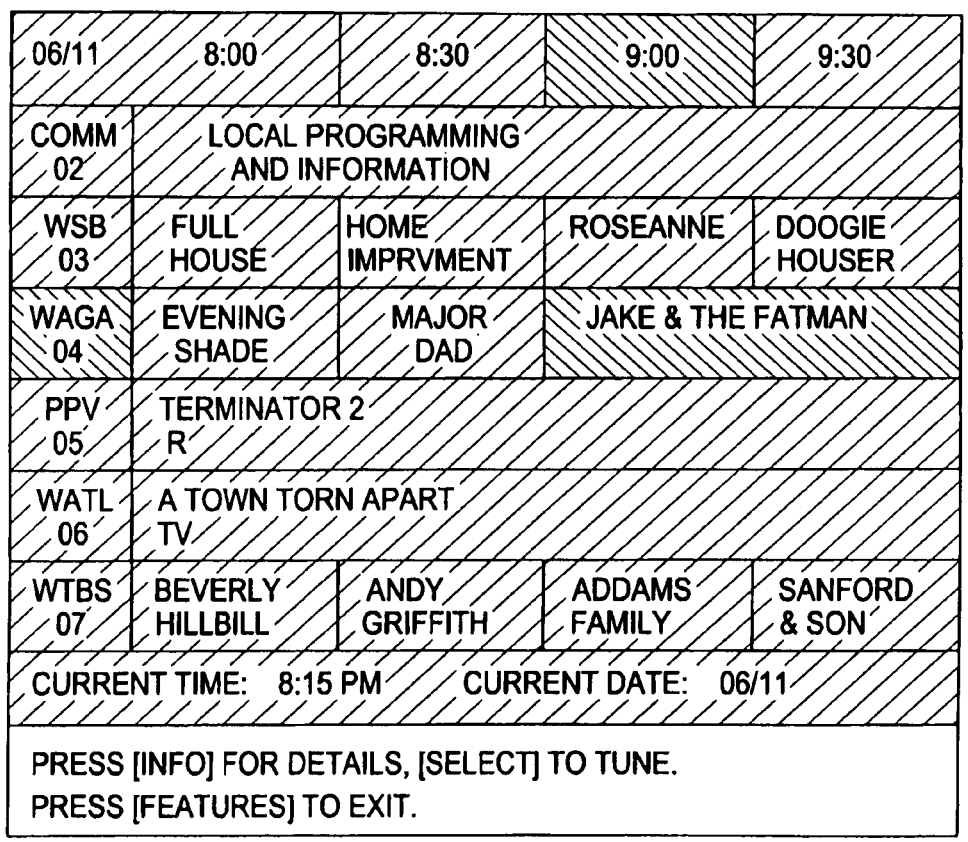
Figure 3:
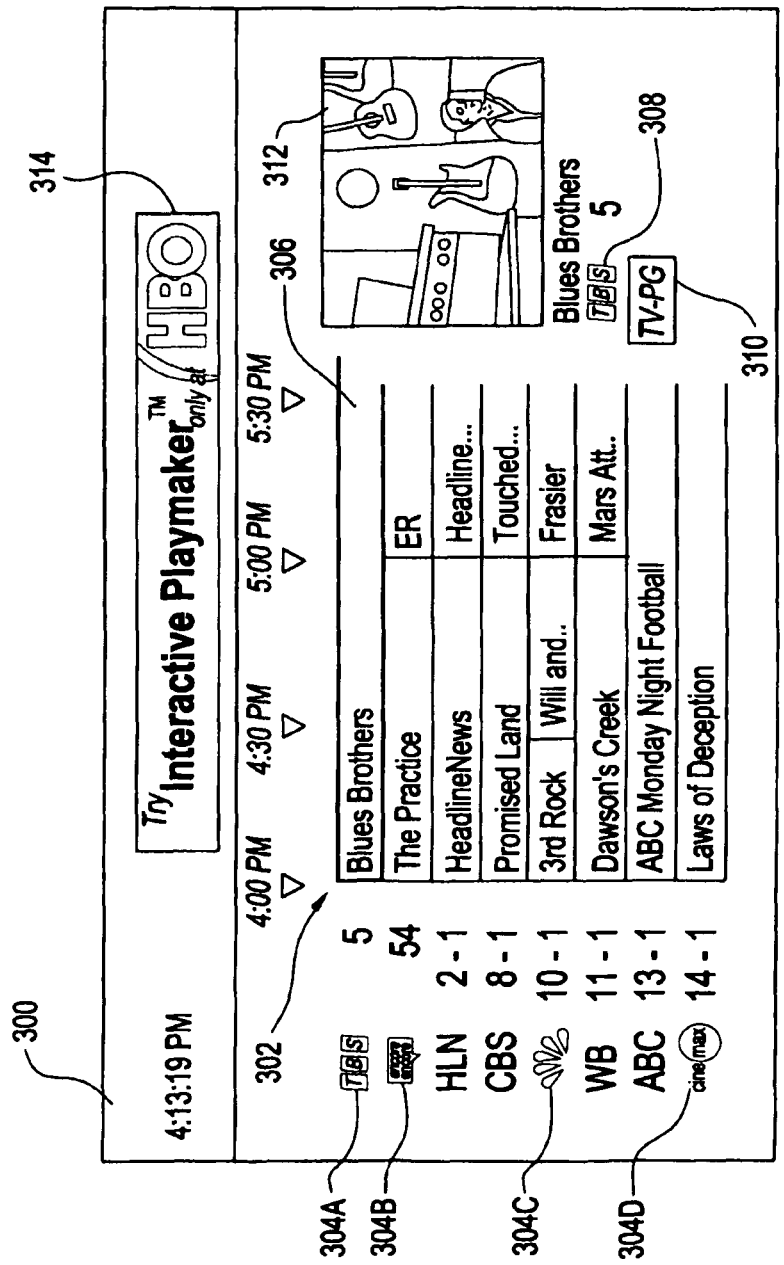
FIG. 3 is a depiction of an EPG screen that includes visually-compelling information made available by way of one or more of the meta data structures according to the invention.

FIG. 3 is a depiction of an example of an EPG screen 300 that includes, among other pieces of information, visually-compelling information made available by way of one or more of the meta data structures according to the invention. The EPG screen 300 includes a grid 302 that represents at least a portion of the schedule of events that a DTV receiver can receive. The grid 302 has rows representing each broadcast channel. For some of the rows, a visually-compelling logo graphic associated with the DTV broadcaster of the respective channel, such as graphic 304A, 304B, 304C and 304D, is depicted.

One of the events, 306, in one of the rows is depicted slightly differently (boxed) to denote its selection by a user of the EPG. Due to its selection, additional visually-compelling information about the event, here the movie "BLUES BROTHERS," is depicted. This additional information includes the following: logo graphic 308 associated with the DTV broadcaster of the respective channel; a graphic 310 representing a rating of potentially-objectionable content in the event; and a movie excerpt still image 312 from the event.

The EPG screen 300 also includes an advertisement graphic 314 related in some way to the selected event 306, the broadcaster of the selected event 314 and/or the source of the selected event 314. Here, the advertisement 314 is for a competing broadcaster of movies etc, that has paid to linked in the EPG meta data so as to be displayed whenever a movie is selected by a user.

The logo graphics 304A-D and 308, the rating graphic 310, the movie excerpt image 312 and the advertisement 314 can each be a still or dynamic image of any suitable image format, such as any one of a GIF-formatted image file, a JPEG-formatted image file, a TIFF-formatted image file, an ASCII text file, an HTML-formatted text file, an XML-formatted text file, a basic audio formatted file having a .au file extension, an MPEG-formatted audio file, a WAV-formatted audio file, an MPEG-formatted video file, a Quicktime-formatted video file, an AVI-formatted video file, a user-defined formatted file, etc.

The logo graphic 308 can be the same as logo graphic 304A or it can be different. Also, it is not necessary to include all of the visually-compelling pieces of information 304A-D, 308, 310, 312 and 314 in an EPG screen.

A meta data generator that can easily be adapted to generate the descriptors according to the invention is the PSIP BUILDER PRO brand of PSIP generator manufactured and sold by TRIVENI DIGITAL INC. The PSIP BUILDER PRO itself is based upon a programmed PC having a Pentium type of processor using the MICROSOFT WINDOWS NT4.0 operating system, with the application software being written in the Java language.

Known text-based EPGs, such as that made and sold by the SHARP Corporation or the RCA Corporation (e.g., model no DTC100), can easily be adapted to recognize and operate upon the descriptors according to the invention.

The first example descriptor according to the invention describes types of visually-compelling data associated with an event not defined. Some of the types of such data might not be described in the PSIP specification.

The other example descriptor according to the invention describes where the visually-compelling data described by the first example descriptor can be found by the electronic program guide (EPG) generator of the DTV receiver.

The example descriptors according to the invention can be included in Virtual Channel Tables (VCTs) and Event Information Tables (EITs). This allows the broadcaster to include a broad range of informational data associated with a virtual channel or an event, respectively.

A brief review of EITs and VCT's according to the PSIP specification is now provided. Generally, an EIT identifies: events, e.g., units of programming, the titles of the events; the start times of the events; and the durations of the events. There may be up to 128 EITs, designated EIT-0 through EIT-127, each covering a three hour period. There a multiple instances of EITs for any given three hour period, i.e., one EIT for each virtual channel. A VCT identifies and describes virtual channels in a physical channel allotted to a terrestrial DTV broadcaster.

The known EIT has the table identification (id) 0xCB and can include the following for each event (referred to as being in the particular event's loop) in its three hour period: a source id field (that points to the source of the physical channel containing the virtual channel in which the event can be found); an event id field; a start time field; an extended text message (ETM) location flag; a length field in units of seconds; a title field; a captions service descriptor field; a content advisory descriptor field; and other descriptor fields as yet unspecified by the PSIP.

The first and/or second example descriptors according to the invention can occupy one or more of the as yet unspecified descriptor fields in an EIT.

The known VCT can be a terrestrial VCT (TVCT) or a cable VCT (CVCT). It can have the table id 0xC8 (TVCT) or 0XC9 (CVCT) and include a transport stream id field that identifies the physical channel allotted to the terrestrial DTV broadcaster. For each virtual channel in the physical channel, the known VCT, among other things, includes: a short channel name field; a major channel number field (often corresponding to the analog television channel number previously associated with the broadcaster); a minor channel number field; a modulation mode field; a carrier frequency mode field; a channel transport stream id field representing the frequency band of the physical channel consumed by the virtual channel; an extended text message (ETM) location flag; a service type indication field; a source id field (that defines a unique number that can be used to identify the virtual channel within the transport stream multiplex); a service location descriptor field; and other descriptor fields as yet unspecified by the PSIP.

The first, second and/or third example descriptors according to the invention can occupy one or more of the as-yet-unspecified descriptor fields in a VCT. The third example descriptor should be included in one or more of the as-yet-unspecified descriptor fields in an ETT.

The first descriptor provides information for associating a type of data with one of the known multipurpose internet mail extensions (MIMEs). This allows a DTV receiver of the descriptor to create a table of types of such data.

The second descriptor is a uniform resource locator (URL) reference providing information about (or a link to) where to find the specific data resource. Such a URL can typically describe the type of access method being used (http) and/or the server location or data stream having the specific data resource.

The third example descriptor is an embellishment of the second descriptor in the sense that it adds indicators about the associated content regarding: whether it is an advertisement; whether it should be displayed with or separately from an EPG screen; and/or where on a display screen it should be located.

The fourth example descriptor defines the genre of the information (event with which it is associated).

The first descriptor, also known as the Information Type Descriptor, will now be discussed in more detail.

The information type descriptor according to the invention is used to describe data types not defined by the ATSC's PSIP standard. As described herein, some non-standard data types are predefined, but more generally the invention provides a way to define such non-standard data types.

The predefined data types correspond to those data types that are typically understood by known receivers. The form of the descriptor follows the standard descriptor form found in ISO/IEC 13818-1:1996, Information technology—Generic coding of moving pictures and associated audio information: Systems (normative).

The Information Type Descriptor syntax is defined in Table 1 as having the following fields.

TABLE 1

Bit Stream Syntax for the Information Type Descriptor

| Syntax | Bits | Format |
|---|---|---|
| information_type_descriptor ( ) { | | |
| descriptor_tag | 8 | 0xC9 |
| descriptor_length | 8 | uimsbf (unsigned integer, most significant bit first) |

TABLE 1-continued

Bit Stream Syntax for the Information Type Descriptor

| Syntax | Bits | Format |
|---|---|---|
| information_type_id | 8 | uimsbf |
| information_desciption_length | 8 | uimsbf |
| information_description_text | var | |
| } | | |

The field, descriptor_tag, is for an 8-bit unsigned integer. It should have the value 0xC9. And it identifies the descriptor as the information_type_descriptor.

The field, descriptor_length, is for an 8-bit unsigned integer. It specifies the length (in bytes) of the fields immediately following this field through to the end of the information type descriptor.

The field, information_type_id, is for an 8-bit unsigned integer. It specifies the information type identifier being defined. The information_type_id is a shorthand representation of the informational text in a field (information_description_text) that indirectly follows it. The expectation is that the decoder (in the DTV receiver) of the information can save this identifier to associate it with the information description, allowing the extended information descriptor to use the id instead of the full description text.

Predefined examples of the information_type_id are described in Table 2.

TABLE 2

Predefined Information Type Identifiers

| ID | Text | Meaning |
|---|---|---|
| 0x00 | image/gif | A GIF-formatted image file |
| 0x01 | image/jpeg | A JPEG-formatted image file |
| 0x02 | image/tiff | A TIFF-formatted image file |
| 0x03 | image/x-xbitmap | An XBM-formatted image file |
| 0x04-0x07 | | Reserved |
| 0x08 | text/plain | A plain ascii text file |
| 0x09 | text/html | An HTML-formatted text file |
| 0x0A | text/xml | An Xml-formatted text file |
| 0x0B-0x0F | | Reserved |
| 0x10 | audio/basic | A basic audio file format (.au) |
| 0x11 | audio/x-mpeg | An MPEG-formatted audio file |
| 0x12 | audio/x-wav | A WAV-formatted audio file |
| 0x13-0x17 | | Reserved |
| 0x18 | video/mpeg | An MPEG-formatted video file |
| 0x19 | video/quicktime | A Quicktime-formatted video file |
| 0x1A | video/avi | An AVI-formatted video clip |
| 0x1B-0x1F | | Reserved |
| 0x20-0xff | | User Defined |

Continuing with the discussion of the fields in the information type descriptor, the field, information_description_length, is for an 8-bit unsigned integer. It specifies the length (in bytes) of the information description that immediately follows. This value is equal to descriptor_length—2 bytes.

The field, information_description_text, is for the description of the information. Typically, this can be a textual MIME type. For example, 'image/gif' can be used to specify that the information_type_id corresponds to the GIF image file type. This field can contain any value that can be interpreted by the decoder.

The second descriptor, also known as the Extended Information Descriptor, will now be discussed in more detail.

The extended information descriptor can contain three fields: a type identifier field that indicates the type of the data being referenced; an expected usage field; and a URL field indicating where the information can be found. The type identifier field can refer to the first example descriptor according to the invention.

The extended information descriptor makes it possible for data to be supplied either in a program included in a transport stream (using the digital storage media command and control (DSMCC) protocol described in ISO/IEC 13818-6 (1998) or some other data protocol) or from some other source (the world wide web, the internet, a private network, etc.). The form of the descriptor follows the standard descriptor form found in, again, ISO/IEC 13818-1:1996, Information technology—Generic coding of moving pictures and associated audio information: Systems (normative).

The Extended Information descriptor syntax is defined in Table 3.

TABLE 3

Bit Stream Syntax for the Extended Information Descriptor

| Syntax | Bits | Format |
|---|---|---|
| extended_information_descriptor ( ) { | | |
|   descriptor_tag | 8 | 0xC8 |
|   descriptor_length | 8 | uimsbf |
|   information_type_id | 8 | uimsbf |
|   information_expected_usage | 8 | uimsbf |
|   information_location_length | 8 | uimsbf |
|   information_location_text | Var | |
| } | | |

The field, descriptor_tag, is an 8-bit unsigned integer. It should have the value 0xC8. And it identifies the descriptor as the extended_information_descriptor.

The field, descriptor_length, is for an 8-bit unsigned integer. It specifies the length (in bytes) of the fields immediately following this field through and to the end of the extended information descriptor.

The field, information_type_id, is for an 8-bit unsigned integer. It specifies the type of information that resides at the specified location.

The field, information_expected_usage, is for an 8-bit unsigned integer. It specifies the expected or intended usage of the information referenced by this descriptor. Table 4 defines some settings for this field. The expected usage indicates a hint to the receiver as to where and/or how the information's creator intended the information to be displayed. Some receivers might not be able to comply with this hint. Behavior in these instances is not defined, but is left to the particular operability of the receiver.

TABLE 4

Information Expected Usage Definitions

| Value | Bits |
|---|---|
| 0x00 | Undefined-No expected usage. Display when and where convenient depending on type. |
| 0x01 | Extended Event EPG Information (Displayed during EPG display when event is selected). |
| 0x02 | Extended Event Selected Information (Displayed when event is selected). |
| 0x03-0x0F | Reserved for future Event Usage definitions. |
| 0x10 | Extended Channel EPG Information (Displayed during EPG display when channel is selected). |
| 0x11 | Extended Channel Selected Information (Displayed when the channel is selected). |
| 0x12-0x1F | Reserved for future Channel Usage definitions. |
| 0x20-0x7F | Reserved for future usage. |
| 0x80-0xFE | User defined. |
| 0xFF | Reserved. |

Continuing with the discussion of the fields in the extended information descriptor, the field, information_location_length—This 8-bit unsigned integer specifies the length (in bytes) of the location text immediately following this field to the end of the descriptor. This field is equal to the descriptor_length—2.

The field, information_location_text—This data represents a string of characters that is interpreted as a URL. The URL is used to reference either a particular data program (e.g., dtv:/salesdata.com) or some other data from, e.g., the www (e.g., http://www.weatherchannel.com/images/logo.gif) or a private network.

The extended information descriptor can be used to specify additional information about a virtual channel or event in a DTV decoder system. This provides for multimedia or graphical elements that can be used to enhance the event or virtual channel data. For example, information in a VCT could refer to a banner advertisement or some graphic with a logo associated with a broadcaster. The associated broadcaster would have some relation (perhaps even that of a competing broadcaster) to that the broadcaster to whom is assigned the physical channel in which the currently-highlighted/selected virtual channel is found. The DTV decoder would then display that information in appropriate locations based on interactions with the user.

The selection of such appropriate locations represents an aspect of the decoder within a DTV receiver and is within the ordinary level of skill in the art. In FIG. 3, such a banner advertisement 314 is located at the top portion of the EPG screen 300. The extended information descriptor for banner advertisement 314 would indicate an information_expected_usage field value of 0x11.

Similarly, if the descriptor is included as part of the event information, the DTV decoder can display extended information such as graphics, ads or even video clips when the user asks for information about the event in the EPG or through some other interaction. The descriptor would indicate an information_expected_usage of 0x01 for this situation.

The extended information descriptor is intended to be a simple reference to the actual data. Since the descriptor includes a URL, the data may be located anywhere and can be displayed if it is accessible by the receiver. The receiver should be very flexible in changing displays if the resource cannot be accessed. Again, this an aspect of the decoder within a DTV receiver that is within the ordinary level of skill in the art.

For many broadcasters, it will be advantageous to provide these resources carrouseled in a separate program stream within their broadcast stream, thus allowing the receiver to quickly obtain the information and display it if the receiver can format the particular file type.

Again, the Information Type descriptor allows the user to extend the types of data that can be sent. The descriptor allows the encoder to specify which identifiers map to which types of data. In this way, a decoder can leverage off previous standards, specifically the MIME type standards, to determine how a data set should be interpreted. The Information Type descriptor is a definition mechanism to allow the encoder to indicate which id will be used for a given MIME type.

For an overall example, assume that a broadcaster KXYZ has a number of banner ads that are being used on the broadcaster's web site to identify the three virtual DTV channels that the broadcaster is providing in the DTV domain via its allotted physical terrestrial DTV channel. The broadcaster also uses a listing service that supplies information concerning the programming along with advertising for those programs. The listing data takes the form of a database that is converted into ATSC A/65-compliant PSIP data. In addition to the program textual information, the listing service also provides a number of pictures (graphics files) that are stills of the respective programs.

To provide a visually-compelling EPG screen as well as advertising to the customer/viewer/user of the EPG, the broadcaster in the overall example decides to include the graphical information concerning the channels provided along with program graphics. The broadcaster uses a portion of the broadcast stream to supply the graphics files in a data carrousel. This carrousel is encoded as program 16. Thus, the program map table (PMT) of the program is encoded at packet identifier (PID) 0x0100. The carrousel is placed on PID 0x010A according the ATSC program information guidelines (A/53). The URL(s) associated with this data carrousel are supplied as part of the PSIP information in the data event tables (DETs) (which were previously referred to as DITs).

In the overall example, the URL of each of the data elements is identified as "btv://kxyz16.kxyz.com/images/progImage.gif" where 'progImage.gif' represents one of the files being provided for each of the programs and "btv" denotes broadcast television. Such a URL is described in more detail in commonly assigned copending application Ser. No. 09/188,189, filed Nov. 10, 1998, the entire contents of which are hereby incorporated by reference.

Assuming the listing service does not supply a complete set of stills, the broadcaster could merely include those that are most important. In addition, the broadcaster can also supply the images from the web site that are used as banners. These are referenced as "btv://kxyz16.kxyz.com/images/bannerX.gif" where "bannerX.gif" represents the banner for each channel X. The carrousel is sent at a limited rate based on the broadcaster's available bandwidth.

For the overall example, in the descriptor loop of each virtual channel (see ATSC A/65 Section 6.3), the extended information descriptor is added which references the banner file supplied. Thus, the descriptor can have the values shown in Table 5.

TABLE 5

Extended Information Descriptor for Virtual Channel 1

| Syntax | Value | Explanation |
|---|---|---|
| extended_information _descriptor ( ) { | | |
| descriptor_tag | 0xC8 | |
| descriptor_ length | 42 | The total byte count. |
| information_type_id | 0 | Indicating a gif file. |
| information_expected_usage | 0x10 | Display during Channel EPG display. |
| information_location_length | 40 | The total character count in the text. |
| information_location_text | 'btv://kxyz16.kxyz.com/images/banner1.gif' | The URL of the first banner for the first channel. |
| } | | |

In Table 5, it is noted that the information_type_id takes advantage of the predefined types of files to indicate that the file is a GIF. Similarly, the reference to each program event extended information is encoded in the associated EITs as in Table 6.

TABLE 6

Example Extended Information Descriptor for Event n

| Syntax | Value | Explanation |
|---|---|---|
| extended_information _descriptor ( ) { | | |
| descriptor_tag | 0xC8 | |
| descriptor_length | 44 | The total byte count. |
| information_type_id | 0 | Indicating a gif file. |
| information_expected_usage | 0x01 | Display during Event EPG display. |
| information_location_length | 42 + digits for N | The total character count in the text. |
| information_location_text | 'btv://kxyz16.kxyz.com/images/progImageN.gif' | The URL of the gif image associated with event N. |
| } | | |

In the overall example, the data need only be sent as frequently as the table it is associated with. Accordingly, the carrousel algorithms can be tuned to only send the channel extended information as fast as the VCT while the event information need only be delivered as fast as the EIT referencing the data. Similarly, when an EIT or Virtual channel becomes obsolete, the associated extended information can be removed from the broadcast stream.

The third descriptor, also known as the External Extended Information Descriptor, will now be described in more detail. The third descriptor includes: a type identifier that indicates the type of the data referenced; a group of hints about usage and positioning (on an EPG such as that of FIG. 3); a start time when the data is valid for display; a duration indicating how long the data should be used; and a URL indicating where the information may be found.

The data for this specific demonstration can be contained in private tables within the same transport stream. The URL referencing this data can take the form "ptm:/<path>" or "ptd:/<extendedID>". The form of the descriptor follows the standard descriptor form found in ref. [2]. The descriptor tag can be defined as 0xC8 for the extended information descriptor.

While there are specific fields providing for usage hints, the actual placement of the descriptor in either the EIT event descriptor loop or VCT virtual channel descriptor loop provides a way to associate the extended information with an event or with a virtual channel. Including this information in the descriptor (as in previous specifications) is redundant. The Extended Information descriptor syntax is defined in Table 7.

TABLE 7

Bit Stream Syntax for the Extended Information Descriptor

| Syntax | Bits | Format |
|---|---|---|
| extended_information_descriptor ( ) { | | |
| descriptor_tag | 8 | 0xC8 |
| descriptor_length | 8 | uimsbf |
| information_type_id | 8 | uimsbf |
| information_advertisement_hint | 1 | bslbf |
| information_guide_hint | 1 | bslbf |
| information_position_hint | 3 | uimsbf |
| information_size_hint | 3 | uimsbf |
| information_start_time | 32 | uimsbf |
| information_duration | 32 | uimsbf |
| information_location_text | var | |
| } | | |

The fields, descriptor_tag, and descriptor_length, have been described above.

The field, information_advertisement_hint can be a single bit indicating whether the associated information represents an advertisement or not. Advertisement information is indicated with a value of '1' while other information is indicated with a value of '0'. Advertisement information will usually be information that is not directly associated with the particular service or event.

The field, information_guide_hint can be a single bit indicating that the information is intended to be displayed during Program Guide mode or during regular program display. A value of '1' indicates that the information is better displayed on program guide. A value of '0' indicates that the information is better displayed on the program display.

The field, information_position_hint can be 3 bits that indicate a hint as to the best position for the particular information. Table 8 provides some example meanings for each of the values.

TABLE 8

Information Position Hint Values

| Value | Meaning |
| --- | --- |
| '000' | Undefined - No positional information supplied. |
| '001' | Background - The associated information should be used as a background of the display if possible. |
| '010' | Logo - Indicates that the information contains a logo that should be displayed in appropriate positions. |
| '011' | Reserved |
| '100' | Upper Left Quadrant (Position 1) |
| '101' | Upper Right Quadrant (Position 2) |
| '110' | Lower Left Quadrant (Position 3) |
| '111' | Lower Right Quadrant (Position 4) |

The field, information_size_hint, can be 3 bits that indicate the intended size for the display of the referenced information. A value of '000' indicates that no size hint is defined for the referenced information. Values '001' through '111' indicates a range of small to large, respectively. The hint may be applied differently based on the type of information. For example, small may indicate that a particular graphic image be displayed in a smaller size while small may mean small fonts for text information.

The field, information_start_time can be 32 bits representing an unsigned integer specifying the start time when the referenced data is valid for display. The time can be represented in GPS seconds since 12 am, Jan. 6, 1980 (standard GPS time). The receiver should not display the data until this time is reached. A value of zero indicates that the data is valid whenever present, that is, there are no time constraints.

The field, information_duration—This 32 bits representing an unsigned integer specifying the duration from the start time when the referenced data is valid for display. The duration can be represented in seconds. The data should be displayed for the time frame specified by the start time for the duration specified. A value of zero indicates that there is no time limit on the particular data element.

The field, information_location_text, can be a variable length string of characters that is interpreted as a URL. The length of this field is equal to descriptor_length—10. The string can have a maximum of 245 characters. Such a URL can take at least two forms: file reference and table_id_extension reference. Protocol indicators can be used to indicate which form to apply. The indicator "ptm" stands for "Private Table Map" and can be followed by a text string that can be used directly to look up table_id_extension references in the mapping table. The indicator "ptd" stands for "Private Table Direct" and can be followed by a number that will correspond directly to the table_id_extension of the private table carrying the data file. Example URLs are "ptm:/demo/logo.gif" and "ptd:/27". In the first case, the receiver software can use the mapping table supplied in the data stream (PID 0x1ffa, Table ID 0xBD, table_id_extension 0x0000) to find out which table_id_extension corresponds to "demo/logo.gif". The resultant table_id_extension can be used to acquire the corresponding table (PID 0x1ffa, Table ID 0xBD, table_id_extension n) and display the logo data found in the table sections. In the second case, the receiver software can use the value "27" directly to look up the private table in the stream (PID 0x1ffa, Table ID 0xBD, table_id_extension 0x001B).

The fourth descriptor, also known as the genre descriptor, will now be described in more detail.

The genre descriptor contains a list of category selection codes. These codes are defined in Table 6.25 of the A/65 Addendum. The fourth descriptor can contain a list of any number of these category codes to allow the associated event to be filtered. The codes can be placed in the descriptor in priority order, e.g., most generic to most specific. The descriptor tag can be 0xCA. The Genre descriptor syntax is defined in Table 9.

TABLE 9

| Bit Stream Syntax for the Genre Descriptor | | |
| --- | --- | --- |
| Syntax | Bits | Format |
| genre_descriptor ( ) { | | |
|   descriptor_tag | 8 | 0xCA |
|   descriptor_length | 8 | uimsbf |
|   for (i==0; i<descriptor_length; i++) { | | |
|     category_selection_code | 8 | uimsbf |
|   } | | |
| } | | |

The field, descriptor_tag, can be an 8-bit unsigned integer having the value 0xCA, identifying the descriptor as the genre_descriptor.

The field, descriptor_length, has been described above.

The field, category_selection_code, can be an 8-bit unsigned integer specifying a category selection code as defined in Table 6.25 of the A/65 Addendum. For example, the codes can be arranged from most generic to most specific. As a more specific example, a classic Western movie can have a genre descriptor with the following content:

| | |
| --- | --- |
| 0xCA | tag |
| 0x03 | length |
| 0x22 | "Movie" |
| 0x89 | "Classic Film" |
| 0x7F | "Western" |

Selection codes are not normative but informative, so there are no mandatory codes only informational codes allowing the receiver to better serve the consumer in finding specific content. Table 6.25 of the A/65 Addendum is included below (as Table 10) for convenience.

TABLE 10

Table 6.25 of A/65 Addendum
Categorical Selection Code Assignments

| Value | Meaning |
|---|---|
| 0x00 | Not Available |
| 0x01-1F | Reserved |
| 0x20 | Education |
| 0x21 | Entertainment |
| 0x22 | Movie |
| 0x23 | News |
| 0x24 | Religious |
| 0x25 | Sports |
| 0x26 | Other |
| 0x27 | Action |
| 0x28 | Advertisement |
| 0x29 | Animated |
| 0x2A | Anthology |
| 0x2B | Automobile |
| 0x2C | Awards |
| 0x2D | Baseball |
| 0x2E | Basketball |
| 0x2F | Bulletin |
| 0x30 | Business |
| 0x31 | Classical |
| 0x32 | College |
| 0x33 | Combat |
| 0x34 | Comedy |
| 0x35 | Commentary |
| 0x36 | Concert |
| 0x37 | Consumer |
| 0x38 | Contemporary |
| 0x39 | Crime |
| 0x3A | Dance |
| 0x3B | Documentary |
| 0x3C | Drama |
| 0x3D | Elementary |
| 0x3E | Erotica |
| 0x3F | Exercise |
| 0x40 | Fantasy |
| 0x41 | Farm |
| 0x42 | Fashion |
| 0x43 | Fiction |
| 0x44 | Food |
| 0x45 | Football |
| 0x46 | Foreign |
| 0x47 | Fund Raiser |
| 0x48 | Game/Quiz |
| 0x49 | Garden |
| 0x4A | Golf |
| 0x4B | Government |
| 0x4C | Health |
| 0x4D | High School |
| 0x4E | History |
| 0x4F | Hobby |
| 0x50 | Hockey |
| 0x51 | Home |
| 0x52 | Horror |
| 0x53 | Information |
| 0x54 | Instruction |
| 0x55 | International |
| 0x56 | Interview |
| 0x57 | Language |
| 0x58 | Legal |
| 0x59 | Live |
| 0x5A | Local |
| 0x5B | Math |
| 0x5C | Medical |
| 0x5D | Meeting |
| 0x5E | Military |
| 0x5F | Miniseries |
| 0x60 | Music |
| 0x61 | Mystery |
| 0x62 | National |
| 0x63 | Nature |
| 0x64 | Police |
| 0x65 | Politics |
| 0x66 | Premier |
| 0x67 | Prerecorded |
| 0x68 | Product |
| 0x69 | Professional |
| 0x6A | Public |
| 0x6B | Racing |
| 0x6C | Reading |
| 0x6D | Repair |
| 0x6E | Repeat |
| 0x6F | Review |
| 0x70 | Romance |
| 0x71 | Science |
| 0x72 | Series |
| 0x73 | Service |
| 0x74 | Shopping |
| 0x75 | Soap Opera |
| 0x76 | Special |
| 0x77 | Suspense |
| 0x78 | Talk |
| 0x79 | Technical |
| 0x7A | Tennis |
| 0x7B | Travel |
| 0x7C | Variety |
| 0x7D | Video |
| 0x7E | Weather |
| 0x7F | Western |
| 0x80 | Art |
| 0x81 | Auto Racing |
| 0x82 | Aviation |
| 0x83 | Biography |
| 0x84 | Boating |
| 0x85 | Bowling |
| 0x86 | Boxing |
| 0x87 | Cartoon |
| 0x88 | Children |
| 0x89 | Classic Film |
| 0x8A | Community |
| 0x8B | Computers |
| 0x8C | Country Music |
| 0x8D | Court |
| 0x8E | Extreme Sports |
| 0x8F | Family |
| 0x90 | Financial |
| 0x91 | Gymnastics |
| 0x92 | Headlines |
| 0x93 | Horse Racing |
| 0x94 | Hunting/Fishing/Outdoors |
| 0x95 | Independent |
| 0x96 | Jazz |
| 0x97 | Magazine |
| 0x98 | Motorcycle Racing |
| 0x99 | Music/Film/Books |
| 0x9A | News-International |
| 0x9B | News-Local |
| 0x9C | News-National |
| 0x9D | News-Regional |
| 0x9E | Olympics |
| 0x9F | Original |
| 0xA0 | Performing Arts |
| 0xA1 | Pets/Animals |
| 0xA2 | Pop |
| 0xA3 | Rock & Roll |
| 0xA4 | Science Fiction |
| 0xA5 | Self Improvement |
| 0xA6 | Sitcom |
| 0xA7 | Skating |
| 0xA8 | Skiing |
| 0xA9 | Soccer |
| 0xAA | Track/Field |
| 0xAB | True |
| 0xAC | Volleyball |
| 0xAD | Wrestling |
| 0xAE-EF | Reserved |
| 0xF0-FE | Reserved for expansion of Basic categories (e.g. 0x20-0x26) |
| 0xFF | Null (not a category) |

An overall example of the fourth example descriptor will be provided; it is entitled demo Mapping Table (dMT) and depicted in Table 11. It is assumed that this table can be cached on the STB so that it can be transmitted at a relatively low interval (e.g., 10 seconds). The dMT can be updated every time a change is made to the data stream. Mappings can remain the same across versions of the table whenever possible.

TABLE 11

Bit Stream Syntax for demo Mapping Table (dMT)

| Syntax | Bits | Format |
|---|---|---|
| demo_mapping_table_section ( ) { | | |
|   table_id | 8 | 0xBD |
|   section_syntax_indicator | 1 | '1' |
|   private_indicator | 1 | '1' |
|   reserved | 2 | '11' |
|   section_length | 12 | uimsbf |
|   table_id_extension | 16 | 0x0000 |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   mappings_defined | 16 | uimsbf |
|   for (i=0;i<mappings_defined;i++) { | | |
|     referenced_table_id_extension | 16 | uimsbf |
|     reserved | 3 | '111' |
|     referenced _table_version_number | 5 | uimsbf |
|     information_location_length | 8 | uimsbf |
|     for (j=0;j<information_location_length;j++) { | | |
|       Information_location_byte | 8 | uimsbf |
|     } | | |
|   } | | |
|   CRC_32 | 32 | rpchof |
| } | | |

The field, table_id, can be an 8-bit unsigned integer having the value 0xBD, identifying the demo private table section.

The field, section_syntax_indicator can be a 1-bit field set to '1' to indicate that this table follows the generic section syntax for tables.

The field, private_ indicator, can be a 1-bit field set to '1' to indicate that this is a private table.

The field, section_length, can be a 12-bit unsigned integer containing the number of bytes following this field to the end of the section. This field should not exceed 4093 bytes.

The field, table_id_extension, can be a 16-bit unsigned integer having the value '0x0000', identifying the demo mapping table section.

The field, version_number, can be a 5-bit field containing the version number of this table. The version_number should be incremented by 1 modulo 32 when a change in the information carried within the demo mapping table occurs. This number should change whenever a table is removed or added from the set of private data tables being supplied. The version number can also increment when a private data table's version number changes.

The field, current_next_indicator, can be a 1-bit field set to '1' to indicate that this is the current valid demo mapping table.

The field, section_number, can be an 8-bit unsigned integer providing the number of the section. The section_number of the first section in a demo mapping table should be 0x00. The section_number should be incremented by 1 with each additional section in this table.

The field, last_section_number, can be an 8-bit unsigned integer providing the number of the last section (that is, the section with the highest section_number) of the table of which this section is a part.

The field, mappings_defined, can be a 16-bit unsigned integer providing the total number of mapping definitions within this section. A mapping definition includes the referenced table extension ID, the referenced table version number, and a textual string that may be used to reference the table.

The field, referenced_table_id_extension, can be a 16-bit unsigned integer defining the extended table ID of the table to be associated with the included URL text information. The associated table can contain a single file as described in the demo_private_table definition below.

The field, referenced_table_version_number, can be a 5-bit unsigned integer corresponding to the current version of the associated demo_private_table. The mapping table should be updated whenever a file is changed in which case the associated table version should change.

The field, information_location_length, can be an 8-bit unsigned specifying the total number of bytes in the following information location text. The bytes included in this loop can match precisely the bytes contained in the extended information descriptors as described above.

The field, information_location_byte, can be an 8-bit ASCII character.

The field, CRC_32, can be a 32-bit unsigned integer containing the CRC value for this particular table section. The CRC calculation is specified in the MPEG2 standard, more particularly Annex A, ISO/IEC 13818-1.

The following is a variation of the dMT example described above, this variation being referred to as the demo Private Table (dPT). Table 12 depicts the dPT. Each dPT can contain a single file included as multiple sections. Tables can be differentiated using the table_id_extension in the section header.

TABLE 12

Bit Stream Syntax for the demo Private Table (dPT)

| Syntax | Bits | Format |
|---|---|---|
| demo_private_table_section ( ) { | | |
|   table_id | 8 | 0xBD |
|   section_syntax_indicator | 1 | '1' |
|   private_indicator | 1 | '1' |
|   reserved | 2 | '11' |
|   section_length | 12 | uimsbf |
|   table_id_extension | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   for (j=0;j<section_length-9;j++) { | | |
|     private_data_byte | 8 | bslbf |
|   } | | |
|   CRC_32 | 32 | rpchof |
| } | | |

The fields, table_id, section_syntax_indicator, private_indicator, section_length, table_id_extension, version_number, current_next_indicator, section_number, and last_section_number have been described above.

The field, private_data_byte, can be an 8-bit field indicating private data that can be concatenated into a complete file at the receiver. The file can be considered as a byte stream with section_number 0x00 containing the first byte of the stream while last_section_number can contain the final byte.

A single data file can be contained in a single table. Note that data files can have a maximum size of 256 (sections)*4084=1,045,504 bytes=1021 KB=0.9971 MB.

The field, CRC_32, has been described above.

Though especially suited to ATSC compliant DTV technology, the invention alternatively is applicable to DTV technologies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital television (DTV) transmitter to transmit digital broadcast data, the DTV transmitter comprising:
    a transmitter that transmits a digital television (DTV) stream, the DTV stream containing an event information table (EIT) that carries a program schedule for a virtual channel, the EIT including a genre descriptor and a caption service descriptor, the genre descriptor comprising:
    a descriptor tag field identifying the descriptor as a genre descriptor;
    a descriptor length field, which is an 8-bit unsigned integer, specifying a length, in bytes, of fields which immediately follow the descriptor length field to an end of the genre descriptor,
    wherein the fields include:
    a category selection code, the category selection code being an attribute code value for an associated event in the DTV stream, the attribute code value specifying a basic genre or category type or detail attribute for the associated event in the DTV stream, and the attribute code value matching a value for the basic genre or category type or detail attribute in a categorical genre code assignments table defined in Advanced Television Standards Committee (ATSC) A/65 standard; and
    wherein the genre descriptor accommodates a plural attribute code values such that the transmitter transmits the plural attribute code values sequentially without intervention, and each attribute code value is defined in the categorical genre code assignments table that is ordered from basic genre or category type to detail attribute, and the genre descriptor references entries in the categorical genre code assignments table, and when a plurality of attribute code values are included in the genre descriptor, the basic genre or category type or the detail attribute code values are specified by 8-bit unsigned integer and at least one attribute code value is specifying a basic genre.

2. The method of claim 1, wherein the basic genre or category type attribute comprises at least one of education, entertainment, movie, news, religion, and sports.

* * * * *